H. C. FOWLER.
Fruit-Jar Top.

No. 219,793. Patented Sept. 16, 1879.

Witnesses:
Sam'l R. Turner
J. B. Holderly

Inventor:
Herbert C. Fowler
By R. S. & A. T. Lacey
Att'ys

UNITED STATES PATENT OFFICE.

HERBERT C. FOWLER, OF MOUNT VERNON, ASSIGNOR OF ONE-HALF HIS RIGHT TO JOSEPH GIBBARD, OF COLUMBUS, OHIO.

IMPROVEMENT IN FRUIT-JAR TOPS.

Specification forming part of Letters Patent No. 219,793, dated September 16, 1879; application filed July 18, 1879.

*To all whom it may concern:*

Be it known that I, HERBERT C. FOWLER, of Mount Vernon, in the county of Knox and State of Ohio, have invented certain new and useful Improvements in Fruit-Jar Tops; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention has for its object to provide a substantial fastening for the tops of fruit-jars; and it consists in the construction and arrangement of the several parts hereinafter described, and pointed out in the claim.

Figure 1:
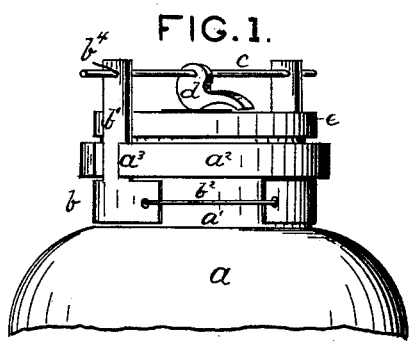
Figure 2:
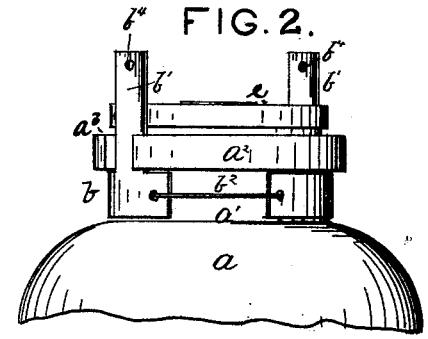
Figure 3:
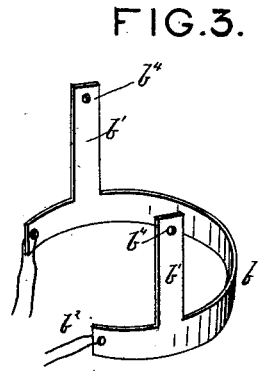
Figure 4:
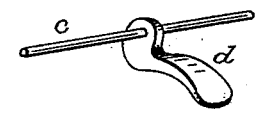

On the drawings, Figure 1 is a side elevation of the upper end of a fruit-jar having my improvement attached thereto. Fig. 2 is the same elevation with the sliding bar and cam removed. Figs. 3 and 4 are detail views.

$a$ is a fruit-jar having a neck, $a^1$, and rim $a^2$. The rim $a^2$ is notched on opposite sides, as shown at $a^3$, to receive the vertical lugs $b^1$ of the collar $b$, placed around the neck $a^1$.

The collar $b$ is open on one side, and when placed on the neck of the jar its ends are united and fastened by a link or bolt, as shown. The lower ends of the lugs $b^1$ are securely fastened to the collar $b$, while their upper ends extend above the top of the jar and have bearing-holes $b^4$ to hold the ends of the cross-bar $c$, which carries the cam-lever $d$, which binds the lid $e$ over the mouth of the jar.

The bar $c$ slides laterally in its bearings $b^4$, and may be removed entirely from the jar. The cam $d$ is fixed or placed centrally on the bar $c$. The bar $c$ may be slipped laterally, so as to bring the cam $d$ more to one side of the cap $e$ than to the other side—an adjustment often found necessary in order to equalize the pressure.

The bar $c$, with its cam $d$, may be removed from the jar when the latter is being cleansed or when being filled with fruit.

The cap $e$ is fastened by placing the bar $c$ in its bearings and turning the cam down, as shown in Fig. 1.

I am aware of the patents granted to W. Silvester, dated January 21, 1879, A. Pope, July 24, 1877, and W. Gilmore, May 11, 1858, and therefore do not claim what is contained therein; but What I do claim is—

The combination, with the neck $a^1$ of the bottle or can $a$, having rim $a^2$, provided with the vertical side notches, $a^3$, and the lid or top $e$, of the collar $b$, having the vertical side lugs, $b^1$, extended above the top $e$ and provided with bearings $b^4$, and the removable bar $c$, sliding laterally in the bearings $b^4$, and cam $d$, fixed at the center of bar $c$, all constructed and arranged as shown and described.

In testimony that I claim the foregoing as my own I affix my signature in presence of two witnesses.

HERBERT CHEENEY FOWLER.

Witnesses:
  C. A. MERRIMAN,
  JOSEPH ELLIOTT.